United States Patent [19]
Ozmar

[11] Patent Number: 4,826,208
[45] Date of Patent: May 2, 1989

[54] SAFETY WEDGE

[76] Inventor: Donald E. Ozmar, 1202 Langhorn Rd., Lynchburg, Va. 24503

[21] Appl. No.: 189,402

[22] Filed: May 2, 1988

[51] Int. Cl.⁴ ............................................. B60R 21/10
[52] U.S. Cl. ..................................... 280/751; 280/801; 297/488
[58] Field of Search ........................ 280/801, 748, 751; 297/488

[56] References Cited
U.S. PATENT DOCUMENTS

| | | | |
|---|---|---|---|
| 3,784,224 | 1/1974 | Peeler | 280/751 |
| 3,945,678 | 3/1976 | Neuman | 297/488 |
| 3,975,037 | 8/1976 | Montschik et al. | 280/733 |
| 4,159,127 | 6/1979 | Czernakowski et al. | 280/751 |
| 4,190,288 | 2/1980 | Korger | 297/408 |

Primary Examiner—Kenneth R. Rice
Attorney, Agent, or Firm—Mason, Fenwick & Lawrence

[57] ABSTRACT

An automobile passenger safety device having a wedge-shaped resilient safety cushion and a pillow hinged thereto. The safety cushion has a supporting surface that provides the passenger with an area for placing reading-writing materials and such. The pillow hinged to the safety cushion provides additional cushioning for the passenger's head. Pockets are provided on the safety cushion for carrying articles that the passenger may use while the safety cushion rests on his lap.

11 Claims, 2 Drawing Sheets

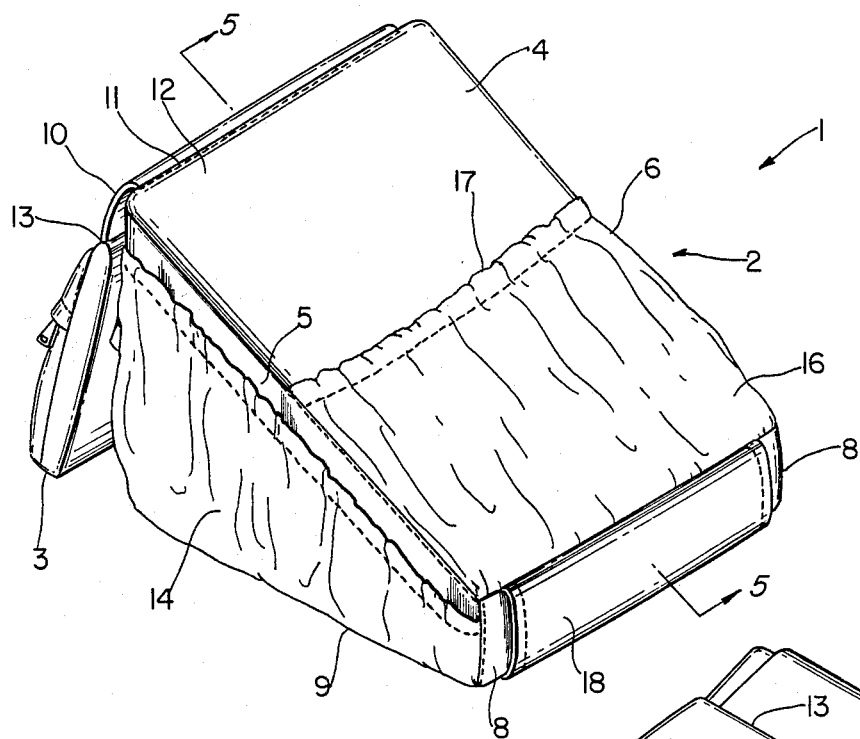
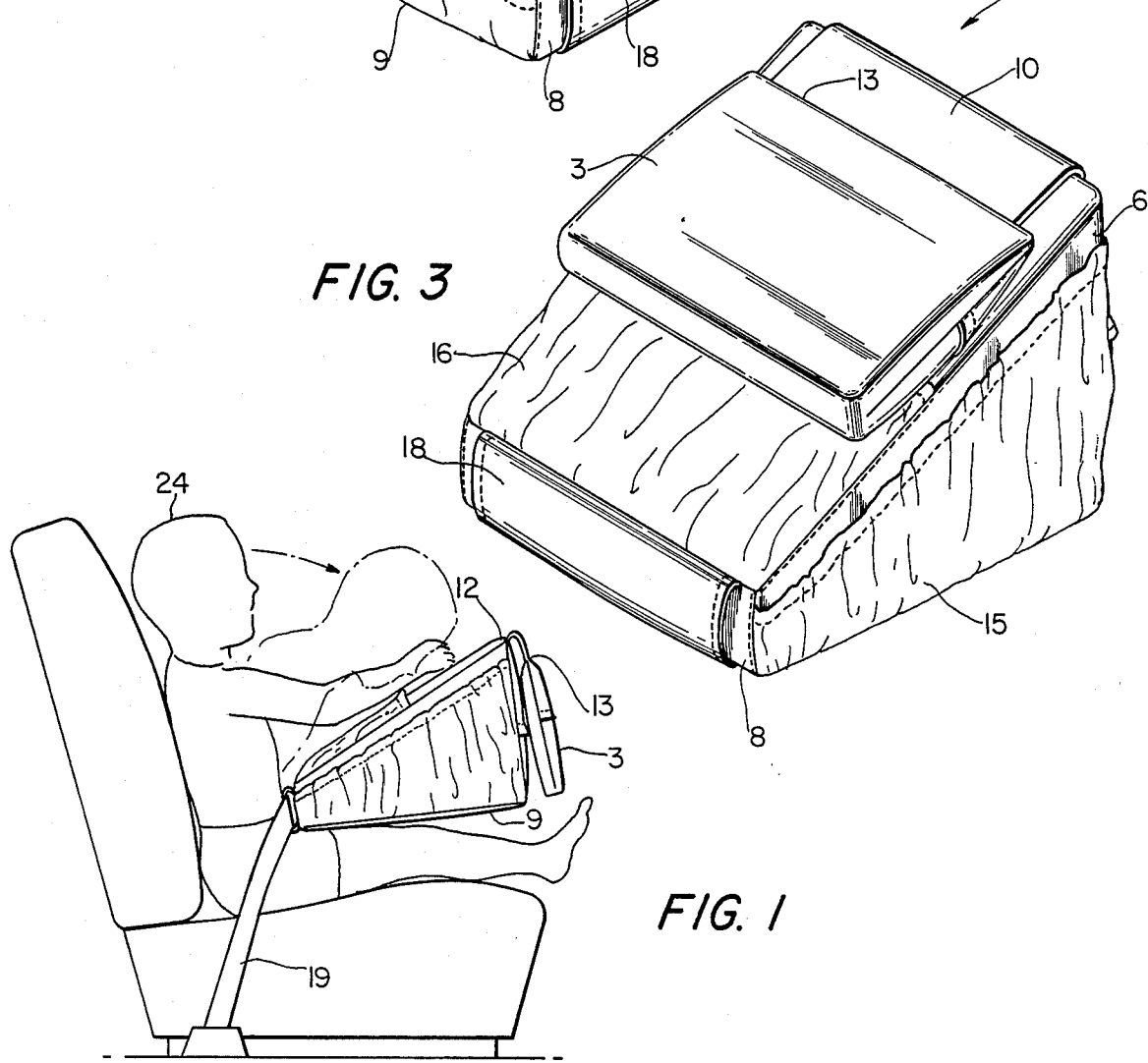

SAFETY WEDGE

BACKGROUND OF THE INVENTION

This invention pertains to automobile passenger safety devices, and more particularly in its preferred embodiment the present invention is directed to a children's passenger safety device that rests on a child's lap to cushion the child-passenger in the event of an automobile accident.

Passenger safety devices that rest on the lap of the passenger, to protect the passenger in case of an accident, are known in the art. U.S. Pat. Nos. 3,975,037, 3,945,678 and 3,784,224 disclose such devices. Although the above cited U.S. Patents teach placing a cushioned safety device on a passenger's lap to protect the passenger from extreme forward movement such as would occur in the event of a collision, their use restricts the freedom of movement of the passenger so as to frequently lead to boredom and irritability when the passenger is a child. Thus the prior art devices do not provide any sort of diversions to occupy the passenger to aid in reduction of boredom and its resultant undesirable conduct. For example, the prior art devices do not provide the passenger with a cushion that may be used for reading, writing, or playing during normal traveling conditions. Nor do the prior art devices disclose a lap safety cushion that can be comfortably used to support a passenger's head while napping. Thus, the need for a passenger safety cushion that can rest on the lap of a passenger, provide cushioning in the event of an accident, and also provide the user with a supporting surface for reading, writing, playing and the like, or comfortably supporting the passenger's head during a nap. The need for such a device is especially emphasized when the passenger is a child. Children need additional protection when riding in an automobile and, in fact many state laws require it. Further, when riding in an automobile, children need activities to keep them busily entertained so as to preserve the peace and welfare of all passengers. Moreover, there is a special need for a for a safety device that can cushion the head while sleeping.

Thus it is the primary object of the present invention to provide a new and improved safety device which overcomes the above-noted shortcomings of the prior art.

SUMMARY OF THE INVENTION

The need for a children's passenger safety device that achieves the foregoing is accomplished by the preferred embodiment by means of a wedge-shaped resilient safety cushion that has a slanted, substantially planar top surface, a pillow hinged to an upper forward edge of the safety cushion, and a number of pockets. The safety cushion's planar top surface can act as a supporting surface for books, writing materials, and such. The slanted surface may also support the hinged pillow if more cushioning is desired. For example, the pillow can be placed on the slanted surface to support the passenger's head during a nap. The pockets provide storage for a variety of items the passenger may need when using the safety cushion.

Accordingly, it is an object of the invention to provide a safety device that cushions a passenger in the event of an accident.

It is a further object of the invention to provide a passenger safety device that allows the user to perform various entertaining tasks while riding in an automobile.

Yet another object of the invention is to provide a passenger safety device that can comfortably support a passenger's head while taking a nap.

Another object of the invention is to provide a passenger safety cushion that is capable of storing a variety of articles that the passenger may use while the cushion is resting on his lap.

The above and further objects and novel features of the invention will more fully appear from the following detailed description and accompanying drawings. Like reference numerals are used in the drawings to designate the same parts illustrated in different figures. It is to be expressly understood, however, that the drawings and written description are for the purpose of illustration only and are not intended as a limiting definition of the invention.

DETAILED DESCRIPTION OF THE DRAWINGS

FIG. 1 is a side elevation of the preferred embodiment of the invention showing its use as a passenger safety cushion;

FIG. 2 is a rear perspective view of the preferred embodiment of the invention with a pillow in a storage or non-use position;

FIG. 3 is another rear perspective view of the preferred embodiment showing the pillow in a head rest position.

DETAILED DESCRIPTION OF THE PREFERRED EMBODIMENT

Figure 4:
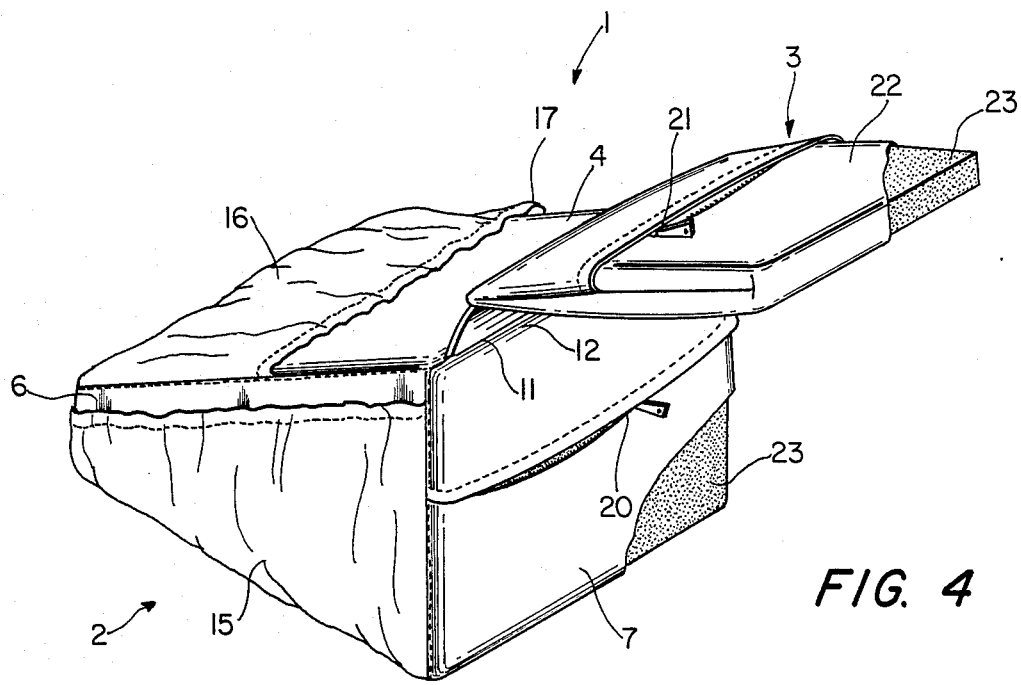
FIG. 4 is a front perspective view of the preferred embodiment.

In describing the preferred embodiment of the subject invention illustrated in the drawings, specific terminology will be resorted to for the sake of clarity. However, the invention is not intended to be limited to the specific terms so selected, and it is to be understood that each specific term includes all the technical equivalents which operate in a similar manner to accomplish a similar purpose.

Referring now to the drawings for better understanding of the invention it will be seen that the preferred embodiment comprises a passenger safety device 1 including a wedge-shaped resilient safety cushion 2 and a pillow 3. The wedge-shaped cushion 2 has a substantially planar slanted top surface 4, first and second gabled sides 5 and 6, a longer front vertical side 7, a shorter rear vertical side 8, and a bottom 9. The pillow 3 is hinged to the safety cushion 2 by a flap 10. The flap 10 is stitched along a first edge 11 to the apex 12 of the safety cushion 2 and along a second edge 13 to the pillow 3. By having the pillow 3 attached to the safety cushion 2 in such a manner, the pillow may be placed in a head rest position as can be best seen in FIG. 3, or it may placed adjacent to the longer front vertical side 7 of the cushion 2, as can be best seen in FIGS. 1, 2, 4 and 5. When the pillow is supported by the surface 4 as seen in FIG. 3 a passenger 24 may have additional cushioning while taking a nap.

The safety cushion 2 is also provided with pockets 14, 15 and 16. Pockets 14 and 15 are attached, respectively, to the first 5 and second 6 gabled sides of the safety cushion 2. A third pocket 16 is attached to the slanted top surface 4. Each pocket 14, 15 and 16 has a resilient strip 17 stitched to the opening of each pocket so that the pocket opening remains taut amd adjacent to the body of the safety cushion 2. The pockets 14, 15 and 16 are very useful for storing items that the passenger 24 may be using while the safety device 1 is resting on his lap.

A safety belt loop 18 is attached to the shorter vertical side 8 of the safety cushion 2. A seat belt 19 passes through the loop 18 to secure the safety-device's position on the passenger's lap as can be best seen in FIG. 1.

Referring now to FIG. 4 it can be seen that the safety cushion 2 and the pillow 3 are each provided with zippers 20 and 21 respectively. The zipper 20 is attached transversely to the longer front vertical side 7 of the safety cushion 2. In a similar manner, the zipper 21 is attached transversely to the back side 22 of the pillow 3. The zippers 20 and 21 provide access to the interiors of safety cushion 2 and the pillow 3 respectively.

Figure 5:
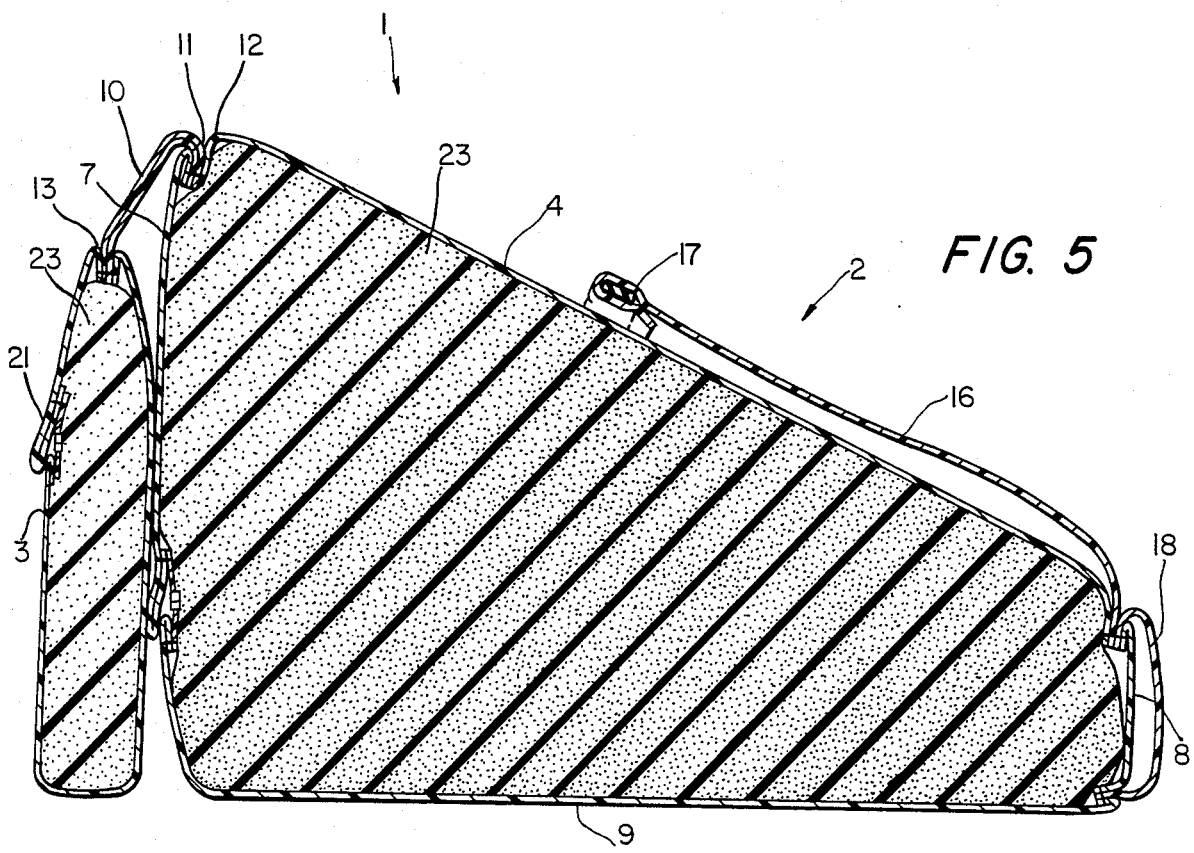
FIG. 5 is a sectional view of the preferred embodiment taken along line 5—5 of FIG. 2.

Referring now to FIGS. 4 and 5 it can be best seen that the interior of the wedge-shaped cushion 2 and the pillow 3 are filled with a foam rubber or equivalent material 23. Whereas many types of resilient-spongy material may be used, it is preferred that a polydacron filler 23 be employed to form the interiors of the cushion and pillow members.

The shell of the safety cushion 2 and pillow 3, along with pockets 14, 15 and 16, belt loop 18 and hinge 10, may be constructed from any suitable fabric. However, it is preferred that vinyl material be used because of its high strength and easy cleaning properties. To construct the device 1 the vinyl material is cut to the appropriate shapes and stitched along the seams using conventional sewing and stitching techniques.

To use the device, the passenger 24, or perhaps the passenger's parent, simply places the seat belt 19 through the belt loop 18 and subsequently fastens the belt 19. The safety device 1, thus, is adequately secure on the passenger's lap. When the safety device 1 is in this position, the passenger 24 may put the pillow 3 adjacent the longer vertical side 7 so that the supporting surface 4 is available to use for reading, writing, playing, or other purposes. If, however, the passenger 24 would like to take a nap, the pillow 3 can be placed in the position as seen in FIG. 3; thus, provide additional cushioning for the passenger's head.

While there is shown and described and pointed out the fundamental features of the invention as applied to the preferred embodiment, it will be understood, however, that the various omissions, substitutions and changes, in the form and details, may be made by those skilled in the art without departing from the spirit of the invention. Further, the invention is not limited to the precise construction herein disclosed and all changes and modifications coming within the scope of the invention as defined in the appended claims are within the scope of the invention.

I claim:

1. An automobile passenger safety device comprising;
  (a) a resilient safety cushion dimensioned and shaped to permit being positioned adjacent to and resting on, the lap of the passenger, and
  (b) a pillow hinged to said resilient safety cushion so that the pillow may be readily placed on said safety cushion to provide additional cushioning for the passenger's head.

2. The device as described in claim 1, further comprising a means for securing said safety cushion to an automobile passenger safety belt.

3. The device as described in claim 2, wherein said resilient safety cushion has a substantially planar slanted top surface that extends between a longer vertical side of said safety cushion, a shorter vertical side of said safety cushion, and first and second gabled sides of said safety cushion.

4. The device as described in claim 3, wherein said means for securing said safety cushion to an automobile passenger safety belt is a loop that is stitched to the shorter vertical side of said safety cushion.

5. The device as described in claim 4, further comprising;
  (a) a first pocket attached to the first gabled side of said safety cushion;
  (b) a second pocket attached to the second gabled side of said safety cushion; and
  (c) a third pocket attached to the slanted surface of said safety cushion, whereby said pockets provide item storage.

6. The device as described in claim 5, wherein said first, second, and third pockets have a resilient strip stitched to the openings of said pockets so that the opening of said pockets remains taut and adjacent to the respective sides of said safety cushion to adequately secure objects stored in said pockets.

7. The device as described in claim 6, wherein the outer surface of said safety cushion and said pillow are constructed of a vinyl material stitched together at the seams.

8. The device as described in claim 7, wherein said safety cushion and said pillows have an interior cushioning material made of polydacron.

9. The device as described in claim 8, wherein said pillow is hinged near the apex of said safety cushion by means of a flap that is stitched along a first edge of said safety cushion and along a second edge to said pillow.

10. The device as described in claim 9, further comprising;
  (a) a first zipper attached transversely to said pillow;
  (b) a second zipper attached transversely to a side of said safety cushion, to provide access to the interior of said pillow and said safety cushion, respectively, for the placement of said cushioning material.

11. An automobile passenger safety device, comprising;
  (a) a resilient safety cushion dimensioned and shaped so as to be positionable adjacent to and resting on, the lap of the passenger, said cushion having a substantially planar slanted top surface that extends between a longer vertical side of said safety cushion, a shorter vertical side of said safety cushion, and first and second gabled sides of said safety cushion;
  (b) a pillow hinged near the apex of said safety cushion so that the pillow may be placed on said slanted surface providing additional cushioning for the passenger's head or adjacent a longer vertical side of said safety cushion so that said slanted surface may be available to the passenger for entertainment purposes.
  (c) a first pocket attached to the first gabled side of said safety cushion, a second pocket attached to the second gabled side of said safety cushion, and a third pocket attached to the slanted surface of said safety cushion, whereby said pockets provide item storage;
(d) a first zipper attached transversely to said pillow to provide access to the interior of said pillow;
(e) a second zipper attached transversely to a side of said safety cushion to provide access to the interior of said safety cushion; and
(f) means for securing said safety cushion to an automobile passenger safety belt.

* * * * *